United States Patent
Derks et al.

(10) Patent No.: US 9,110,245 B2
(45) Date of Patent: Aug. 18, 2015

(54) LOW LAYER COUNT REFLECTIVE POLARIZER WITH OPTIMIZED GAIN

(75) Inventors: Kristopher J. Derks, Woodbury, MN (US); Michael F. Weber, Shoreview, MN (US); Shandon D. Hart, Corning, NY (US); Carl A. Stover, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 1272 days.

(21) Appl. No.: 12/935,500

(22) PCT Filed: Mar. 27, 2009

(86) PCT No.: PCT/US2009/038585
§ 371 (c)(1),
(2), (4) Date: Dec. 20, 2010

(87) PCT Pub. No.: WO2009/123928
PCT Pub. Date: Oct. 8, 2009

(65) Prior Publication Data
US 2011/0102891 A1    May 5, 2011

Related U.S. Application Data

(60) Provisional application No. 61/040,910, filed on Mar. 31, 2008.

(51) Int. Cl.
*G02B 5/30*    (2006.01)
*G02B 27/28*    (2006.01)

(52) U.S. Cl.
CPC .............. *G02B 5/3066* (2013.01); *G02B 5/305* (2013.01); *G02B 5/3041* (2013.01); *G02B 5/3083* (2013.01); *G02B 27/283* (2013.01)

(58) Field of Classification Search
CPC .... G02B 5/3041; G02B 5/305; G02B 5/3066; G02B 5/3083; G02B 27/283
USPC ............. 359/485.02, 485.03, 489.12, 489.13, 359/489.19, 900
See application file for complete search history.

(56) References Cited

U.S. PATENT DOCUMENTS

| | | |
|---|---|---|
| 3,610,729 A | 10/1971 | Rogers |
| 4,072,779 A | 2/1978 | Knox |

(Continued)

FOREIGN PATENT DOCUMENTS

| | | |
|---|---|---|
| EP | 0978753 | 2/2000 |
| JP | 11-142646 | 5/1999 |

(Continued)

OTHER PUBLICATIONS

ASTM Designation: D 4065-06, Standard Practice for Plastics; Dynamic Mechanical Properties; Determination and Report of Procedures, 2006.

(Continued)

*Primary Examiner* — Ricky D Shafer
(74) *Attorney, Agent, or Firm* — Daniel J. Iden

(57) ABSTRACT

Multilayer reflecting polarizing films are disclosed having increased in-plane refractive index differences between adjacent microlayers along both the pass and block axis, and having negative refractive index differences between adjacent microlayers along the thickness or z-axis. Major front and back surfaces of the film exposed to air provide a Fresnel reflectivity component to the pass axis reflectivity, and the microlayers provide a microlayer component to the pass axis reflectivity, such microlayer component preferably having a reflectivity of p-polarized light that increases with incidence angle faster than the Fresnel reflectivity component decreases so as to substantially avoid off-axis gain peaks for p-polarized light. The films preferably utilize a relatively small total number of microlayers, arranged in a single coherent stack with monotonic optical repeat unit thickness profile, and at least some microlayers preferably include polyethylene naphthalate or a copolymer thereof.

39 Claims, 6 Drawing Sheets

(56) References Cited

U.S. PATENT DOCUMENTS

| | | |
|---|---|---|
| 4,098,952 A | 7/1978 | Kelly |
| 4,379,039 A | 4/1983 | Fujimoto |
| 4,446,305 A | 5/1984 | Rogers |
| 4,540,623 A | 9/1985 | Im |
| 5,103,337 A | 4/1992 | Schrenk |
| 5,360,659 A | 11/1994 | Arends |
| 5,391,429 A | 2/1995 | Otani |
| 5,427,835 A | 6/1995 | Morrison |
| 5,448,404 A | 9/1995 | Schrenk |
| 5,474,730 A | 12/1995 | Gust |
| 5,706,068 A | 1/1998 | Abileah |
| 5,751,388 A | 5/1998 | Larson |
| 5,793,456 A | 8/1998 | Broer |
| 5,825,542 A | 10/1998 | Cobb, Jr. |
| 5,825,543 A | 10/1998 | Ouderkirk |
| 5,828,488 A | 10/1998 | Ouderkirk |
| 5,867,316 A | 2/1999 | Carlson |
| 5,882,774 A | 3/1999 | Jonza |
| 6,080,467 A * | 6/2000 | Weber et al. .................. 428/212 |
| 6,101,032 A * | 8/2000 | Wortman et al. ........ 359/485.04 |
| 6,117,530 A * | 9/2000 | Jonza et al. ................... 428/212 |
| 6,122,103 A | 9/2000 | Perkins |
| 6,157,490 A | 12/2000 | Wheatley |
| 6,179,948 B1 | 1/2001 | Merrill |
| 6,235,850 B1 | 5/2001 | Perez |
| 6,339,501 B1 | 1/2002 | Kameyama |
| 6,352,761 B1 | 3/2002 | Hebrink |
| 6,368,699 B1 | 4/2002 | Gilbert |
| 6,480,248 B1 | 11/2002 | Lee |
| 6,497,946 B1 | 12/2002 | Kretman |
| 6,521,732 B2 | 2/2003 | Perez |
| 6,531,230 B1 | 3/2003 | Weber |
| 6,593,423 B1 | 7/2003 | Kondos |
| 6,641,883 B2 | 11/2003 | Weber |
| 6,685,341 B2 * | 2/2004 | Ouderkirk et al. ............ 362/297 |
| 6,783,349 B2 | 8/2004 | Neavin |
| 6,827,886 B2 | 12/2004 | Neavin |
| 6,893,731 B2 | 5/2005 | Kausch |
| 6,917,399 B2 | 7/2005 | Pokorny |
| 6,924,014 B2 * | 8/2005 | Ouderkirk et al. ........... 428/35.7 |
| 6,927,900 B2 | 8/2005 | Liu |
| 6,937,303 B2 | 8/2005 | Jang |
| 6,972,813 B1 | 12/2005 | Toyooka |
| 6,991,695 B2 | 1/2006 | Tait |
| 7,018,689 B2 | 3/2006 | Lee |
| 7,041,365 B2 | 5/2006 | Kausch |
| 7,180,666 B2 | 2/2007 | Benoit |
| 7,220,026 B2 | 5/2007 | Ko |
| 7,277,141 B2 | 10/2007 | Pokorny |
| 7,306,835 B2 | 12/2007 | Hong |
| 7,320,538 B2 | 1/2008 | Ko |
| 7,416,309 B2 | 8/2008 | Ko |
| 7,557,989 B2 | 7/2009 | Cross |
| 7,905,650 B2 | 3/2011 | Ma |
| 8,007,118 B2 * | 8/2011 | O'Neill et al. .................. 362/19 |
| 2001/0031837 A1 | 10/2001 | Perez |
| 2002/0154406 A1* | 10/2002 | Merrill et al. .................. 359/498 |
| 2002/0159019 A1 | 10/2002 | Pokorny |
| 2004/0099992 A1 | 5/2004 | Merrill |
| 2004/0190138 A1 | 9/2004 | Toyomasu |
| 2005/0248928 A1 | 11/2005 | Benoit |
| 2006/0027321 A1 | 2/2006 | Schaffer |
| 2006/0029784 A1 | 2/2006 | Doan |
| 2006/0074214 A1 | 4/2006 | Kesselmayer |
| 2006/0084780 A1 | 4/2006 | Hebrink |
| 2006/0099411 A1 | 5/2006 | Xia |
| 2006/0103777 A1 | 5/2006 | Ko |
| 2006/0162857 A1 | 7/2006 | Nagamoto |
| 2006/0216524 A1 | 9/2006 | Klun |
| 2006/0221447 A1 | 10/2006 | DiZio |
| 2006/0226561 A1 | 10/2006 | Merrill |
| 2006/0232863 A1 | 10/2006 | Nevitt |
| 2006/0250707 A1 | 11/2006 | Whitney |
| 2006/0291055 A1 | 12/2006 | Gehlsen |
| 2007/0024994 A1 | 2/2007 | Whitney |
| 2007/0047080 A1 | 3/2007 | Stover |
| 2007/0053080 A1 | 3/2007 | Harada |
| 2007/0231561 A1 | 10/2007 | Pellerite |
| 2008/0002256 A1 | 1/2008 | Sasagawa |
| 2008/0049419 A1 | 2/2008 | Ma |
| 2008/0102262 A1 | 5/2008 | Esaki |
| 2008/0266904 A1 | 10/2008 | Ko |
| 2009/0029129 A1 | 1/2009 | Pellerite |
| 2010/0165660 A1 | 7/2010 | Weber |
| 2010/0277668 A1 | 11/2010 | Frank |
| 2011/0014391 A1 | 1/2011 | Yapel |
| 2011/0019280 A1 | 1/2011 | Lockridge |
| 2011/0027493 A1 | 2/2011 | Yapel |
| 2011/0038140 A1 | 2/2011 | Ma |
| 2011/0043727 A1 | 2/2011 | Bösl |
| 2011/0051040 A1 | 3/2011 | Johnson |
| 2011/0059249 A1 | 3/2011 | Yapel |
| 2011/0103036 A1 | 5/2011 | Bösl |

FOREIGN PATENT DOCUMENTS

| | | |
|---|---|---|
| JP | 2007131698 | 5/2007 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 99/36248 | 7/1999 |
| WO | WO 99/36262 | 7/1999 |
| WO | WO 99/39224 | 8/1999 |
| WO | WO 2004/003631 | 1/2004 |
| WO | WO 2006/126128 | 11/2006 |
| WO | WO 2009/123928 A1 | 10/2009 |

OTHER PUBLICATIONS

ASTM Designation: D 5026-01, Standard Test Method for Plastics; Dynamic Mechanical Properties: In Tension, 2001.

International Standard ISO 11664-4 (CIE S 014-4/E), "Colorimetry—Part 4: CIE 1976 L*A*B Colour space", First Edition, Nov. 1, 2008.

"Cure Dosage and Adhesion Promotors for Ultraviolet Curable Laminating Adhesives", DA Smith, Sartomer Co., dated Mar. 2007.

International Search Report for PCT/US2009/038585, 3 pgs., dated Jun. 18, 2009.

"Michel Lévy Color Chart: Polarized Light Conoscopic Determination", Light Microscopy, Carl Zeiss, Nov. 2002, 6 pgs.

Modern Coating and Drying Technology, editor Cohen and Gutoff, VCH Publishers, Inc., pp. 122-126, (1992).

"New Radiation Curable Polyester Acrylate Oligomers Exhibiting Superior Abrasion Resistant Properties While Offering a Cost Effective Alternative to Urethane Acrylate Oligomers", WR Schaeffer, Sartomer Co., dated Mar. 2006.

"Radiation Curable Oligomers Combining Superior Wear Properties with Enhanced Chemical and Moisture Resistance", W. Schaeffer, Sartomer Co., dated Jul. 2005.

Tricot, "Surfactants: Static and Dynamic Surface Tension", Liquid Film Coating, Kistler and Schweizer editors, pp. 99-136, (1997).

Weber, "Giant Birefringent Optics in Multilayer Polymer Mirrors", Science, Mar. 31, 2000, vol. 287, pp. 2451-2456, XP000990141.

U.S. Appl. No. 60/939,079, "Backlight and Display System Using Same", filed May 20, 2007.

Written Opinion of the ISA for International Application No. PCT/US2009/038,565, 6 pages (Oct. 5, 2010).

H.A. Macleod, Thin-Film Optical Filters, $2^{nd}$ Ed., Macmillan Publishing Co., (1986), Table of Contents and chapters 2, 5, and 8.

Alfred Thelen, Design of Optical Interference Coatings, McGraw-Hill, Inc., (1989), Table of Contents and chapters 2, 5, 9, and 12.

* cited by examiner

US 9,110,245 B2

LOW LAYER COUNT REFLECTIVE POLARIZER WITH OPTIMIZED GAIN

RELATED APPLICATIONS

This application is a national stage filing under 35 U.S.C. 371 of PCT/US2009/038585, filed on Mar. 27, 2009, which claims priority to U.S. Provisional Patent Application No. 61/040910, filed on Mar. 31, 2008, the disclosure of which is incorporated by reference in its entirety.

FIELD OF THE INVENTION

This invention relates generally to multilayer optical films, with particular application to such films configured as polarizers that are suitable for use in backlights for visual display systems.

BACKGROUND

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("micro layers") on a substrate in a vacuum chamber. Inorganic. multilayer optical films are described, for example, in textbooks by H. A. Macleod, *Thin-Film Optical Filters*, 2nd Ed., Macmillan Publishing Co, (1986) and by A. Thelen, *Design of Optical Interference Filters*, McGraw-Hill, Inc. (1989).

Multilayer optical films have also been demonstrated by coextrusion of alternating polymer layers. See, e.g., U.S. Pat. Nos. 3,610,729 (Rogers), 4,446,305 (Rogers et al.), 4,540,623 (Im et al.), 5,448,404 (Schrenk et al.), and 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Thicker layers are also typically included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

In some cases, the microlayers have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength $\lambda$ is twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. Nos. 5,360,659 (Arends et al.) and 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. Nos. 5,882,774 (Jonza et al.) and 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See e.g. U.S. Pat. No. 6,368,699 (Gilbert et al.). Methods and devices for making multilayer optical films are discussed in U.S. Pat. No. 6,783,349 (Neavin et al.).

FIG. 1 depicts one layer pair of a multilayer optical film 10. The film 10 includes a large number of alternating microlayers 12, 14, only two of which are shown for simplicity. The microlayers have different refractive index characteristics so that some light is reflected at the interfaces between adjacent microlayers. The microlayers are thin enough so that light reflected at a plurality of the interfaces undergoes constructive or destructive interference to give the film the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 µm. Thicker layers are also typically included, such as skin layers at the outer surfaces of the film, or protective boundary layers disposed within the film that separate packets of microlayers.

The reflective and transmissive properties of multilayer optical film 10 are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. In FIG. 1, these indices are labeled n1x, n1y, n1z for layer 12, and n2x, n2y, n2z for layer 14, their respective layer-to-layer differences being $\Delta n_x$, $\Delta n_y$, $\Delta n_z$. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. Film 10 is made by co-extrusion of a large number, e.g. tens or hundreds of layers of two alternating polymers A, B, typically followed by passing the multilayer extrudate through one or more multiplication die, and then stretching or otherwise orienting the extrudate to form a final film. The resulting film is typically composed of many hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index ($\Delta n_x$) for light polarized along the x-axis of at least 0.05. If the high reflectivity is desired for two orthogonal polarizations, then the adjacent microlayers also can be made to exhibit a difference in refractive index ($\Delta n_y$) for light polarized along the y-axis of at least 0.05.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In many applications, the ideal reflecting polarizer has high reflectance along one axis (the "extinction" or "block" axis, corresponding to the x-direction) and zero reflectance along the other axis (the "transmission" or "pass" axis, corresponding to the y-direction). If some reflectivity occurs along the transmission axis, the efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices n1y and n2y. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

Reflective polarizers are often used in visual display systems such as liquid crystal displays. These systems—now found in a wide variety of electronic devices such as mobile phones, computers, and some flat panel TVs—use a liquid crystal (LC) panel illuminated from behind with an extended area backlight. The reflective polarizer is placed over or otherwise incorporated into the backlight to transmit light of a polarization state useable by the LC panel from the backlight to the LC panel. Light of an orthogonal polarization state, which is not useable by the LC panel, is reflected back into the backlight, where it can eventually be reflected back towards the LC panel and at least partially converted to the useable polarization state, thus "recycling" light that would normally be lost, and increasing the resulting brightness and overall efficiency of the display.

A representative visual display system 20 is shown in schematic side view in FIG. 2. The system 20 includes an LC panel 22 and an illumination assembly or backlight 24 positioned to provide light to the LC panel 22. The LC panel 22 includes a layer of liquid crystal disposed between glass panel plates. The LC panel 22 is positioned between an upper absorbing polarizer 26 and a lower absorbing polarizer 28. The absorbing polarizers 26, 28 and the LC panel 22 in combination control the transmission of light from the backlight 24 through the display system 20 to the viewer. Selective activation of different pixels of the liquid crystal layer by an electronic display controller results in the light passing out of the display system 20 at the selected pixels, thus forming an image seen by the viewer.

The backlight 24 includes light sources, whether disposed in an edge-lit configuration (light source 30*a*) or a direct-lit configuration (light sources 30*b*), and distributes light from the sources over an output area that matches the viewable area of the LC panel 22. The light sources may be cold cathode fluorescent lamps (CCFLs) or light emitting diodes (LEDs), for example, and either individually or in combination they produce white light. The backlight 24 also includes a film stack generically depicted at 32, which may include various optical components such as a diffuser plate, prismatic brightness enhancement film (BEF), and the multilayer reflective polarizer discussed above. The backlight includes an enclosure whose inner bottom surface 34*a* and inner side surfaces 34*b* can be reflective to promote light recycling and enhance system efficiency. In some cases the backlight may also incorporate a solid light guide to transport light from edge-mounted light sources (light source 30*a*) evenly over the output area.

In any case, the backlight provides an extended light source that the LC panel 22 uses to produce an image that can be perceived by the viewer, who may be observing from on-axis (normal or near-normal) viewing directions (viewer 36a, positioned along the z-axis which is perpendicular to the multilayer reflective polarizer and to the other extended optical components of the system 20), or from off-axis or oblique viewing directions (viewer 36b).

One measure of performance of the reflective polarizer in the context of a display system such as system 20 is referred to as "gain". The gain of a reflective polarizer or other optical film is a measure of how much brighter the display appears to the viewer with the optical film compared to the display without the optical film. More specifically, the gain of an optical film is the ratio of the luminance of the display system (or of a portion thereof, such as the backlight) with the optical film to the luminance of the display system without the optical film. Since luminance is in general a function of viewing orientation (see e.g. viewers 36a, 36b in FIG. 2), gain is also a function of viewing orientation. If gain is referred to without any indication of orientation, on-axis performance is ordinarily presumed. High gains are normally associated with reflective polarizers that have very high reflectivity for the block axis and very high transmissivity (very low reflectivity) for the pass axis, for both normally and obliquely incident light. This is because a very high block axis reflectivity maximizes the chance that a light ray of the non-useable polarization will be reflected back into the backlight so that it can be converted to the useable polarization; and a very low pass axis reflectivity maximizes the chance that a light ray of the useable polarization will pass out of the backlight towards the LC panel, with minimal loss.

Another performance measure of the reflective polarizer in the context of a full RGB color display system is the amount of color the component introduces into the system, both on-axis and off-axis, as a result of spectral non-uniformities in reflectance or transmission. Ideally, a polarizer reflects and transmits uniformly over the entire visible spectrum from about 400 to 700 nm so that it introduces no significant perceived color into the display, either on-axis or off-axis. This is most easily achieved if, again, the block axis reflectivity is as high as possible and the pass axis reflectivity is as small as possible, or more precisely, if the portion of the pass axis reflectivity due to interference effects from the microlayers is as small as possible. (The remaining portion of the pass axis reflectivity, which is due to Fresnel surface reflections at the front and back major surfaces of the polymeric reflective polarizer exposed to air, has virtually no impact on color since such air-to-polymer surface reflections are substantially spectrally uniform.) Microlayer stacks that have neither very small nor very large reflectivities are more difficult to control for color over the visible spectrum. This is because at intermediate reflectivities, even very small variations in the layer thickness profile of the stack, relative to an ideal or target thickness profile, can easily produce spectral deviations from a target flat reflection spectrum that can be readily perceived by the human eye in transmitted or reflected light.

In keeping with the above considerations, two commercially available multilayer reflective polarizer products, described in more detail below, are able to achieve good gain and low color characteristics using film designs that are different in some respects but that both have on-axis pass axis reflectivities that are very low by keeping $\Delta n_y$ very small.

BRIEF SUMMARY

We have observed, however, that both of these commercial reflective polarizers exhibit off-axis gain peaks for p-polarized light. These off-axis gain peaks are relatively small, but can detract from the on-axis gain or brightness to an extent that may be significant in some applications. We have found that the gain peaks are related to the very small pass axis reflectivity component associated with the microlayers, in combination with Fresnel surface reflectivity associated with the outer surfaces of the polarizer and the dependence of that Fresnel reflectivity on incidence angle.

We therefore describe here, among other things, multilayer reflective polarizers that utilize new combinations of design features to provide exemplary gain and color performance while substantially avoiding the off-axis gain peaks. We describe, for example, new selection criteria for the polymer materials used in the reflective polarizer that increase the in-plane index differences $\Delta n_x$, $\Delta n_y$ (while providing a suitable out-of-plane index difference $\Delta n_z$) to an extent that the pass axis reflectivity component associated with the microlayers, while still much smaller than the block axis reflectivity, is large enough to overcome the angular dependence of the Fresnel surface reflectivity of the outer surfaces so as to avoid the off-axis gain peaks. The selection criteria are also fortuitously compatible with low layer count films.

In exemplary embodiments, a reflective polarizer has a block (x) axis and a pass (y) axis, and first and second opposed major surfaces exposed to air and therefore exhibiting Brewster angle reflection minima, the major surfaces being disposed perpendicular to a z-axis. A stack of N microlayers is disposed between the major surfaces and arranged into pairs of adjacent microlayers that exhibit refractive index differences along the x-, y-, and z-axes of $\Delta n_x$, $\Delta n_y$, and $\Delta n_z$ respectively, where $\Delta n_x > \Delta n_y > 0 > \Delta n_z$.

In exemplary embodiments, the number N and the index difference $\Delta n_x$ in combination are large enough to provide the polarizer with a high reflectivity for normally incident light polarized along the x-axis of Rblocknormal, Rblocknormal being at least 80%. The number N and the index difference $\Delta n_y$ in combination are small enough to provide the polarizer with a low reflectivity for normally incident light polarized along the y-axis of Rpassnormal, Rpassnormal being 25% or less. The number N and the index difference $\Delta n_y$ in combination are large enough so that the reflective polarizer exhibits a reflectivity greater than Rpassnormal for p-polarized light incident in the y-z plane at the Brewster angle of the first major surface. Preferably, $\Delta n_y$ is responsible for an incremental portion Rpassinc of Rpassnormal, and a corresponding portion of $\Delta n_x$ equal to $\Delta n_y$ is responsible for an incremental portion Rblockinc of Rblocknormal, and the number N is small enough so that Rblockinc is comparable to Rpassinc. For example, Rblockinc is at least half of Rpassinc, or is at least equal to Rpassinc.

In exemplary embodiments, the microlayers are arranged into optical repeat units each of which has an optical thickness, the optical repeat units being arranged to provide a substantially monotonically or smoothly increasing optical thickness profile. At least some of the N microlayers comprise polyethylene naphthlate or a copolymer thereof, and N is 350 or less, or 300 or less, or in a range from 250 to 350, or in a range from 275 to 375. Alternatively, at least some of the N microlayers comprise polyethylene terephthalate or a copolymer thereof, and N is 800 or less, or 650 or less, or in a range from 300 to 650, or in a range from 500 to 650. The reflective polarizer has a high reflectivity Rblocknormal for normally incident light polarized along the x-axis, and a low reflectivity Rpassnormal for normally incident light polarized along the y-axis, Rblocknormal being at least 80%. Rpassnormal is preferably less than 30% or 25% but is preferably at least 2% more than a combined normal incidence reflectivity of the major surfaces. The reflective polarizer preferably exhibits a reflectivity greater than Rpassnormal for p-polarized light incident in the y-z plane at the Brewster angle of the first major surface.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
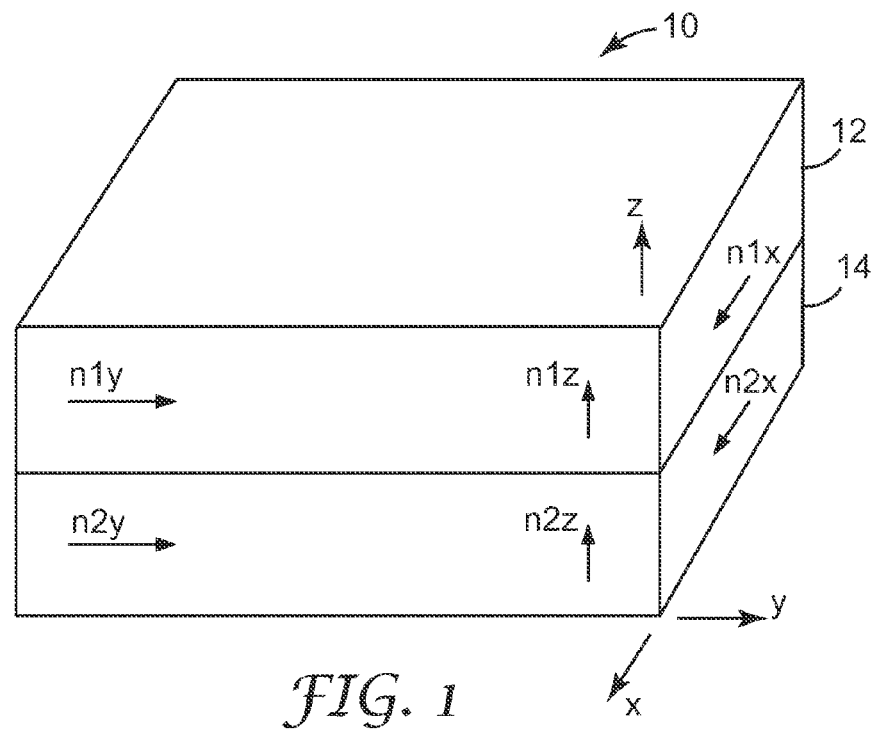
FIG. 1 is a perspective view of a layer pair of a multilayer optical film.
Figure 2:
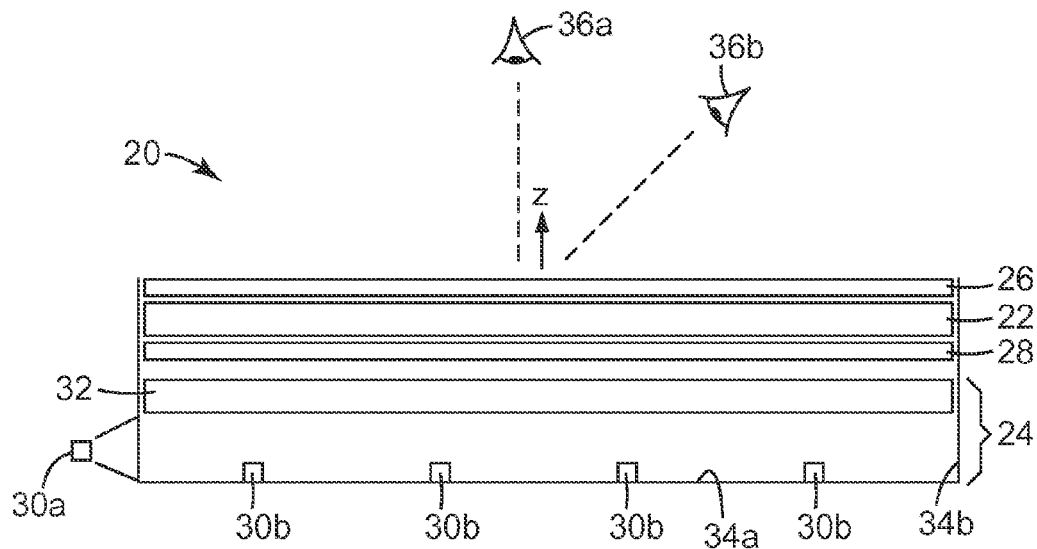
FIG. 2 is a schematic side view of a display system.
Figure 3:
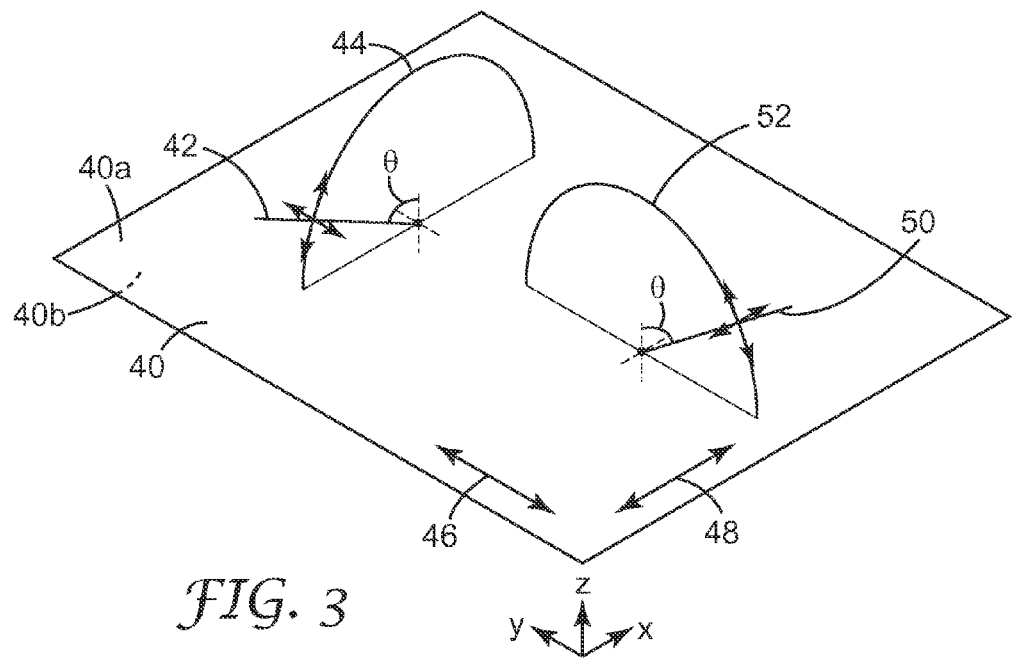
FIG. 3 is a perspective view of an optical film in relation to a Cartesian coordinate system.

In order to more clearly describe the off-axis gain behavior observed in commercially available reflective polarizers, we provide in FIG. 3 a perspective view of an optical film 40 in relation to a global x-y-z Cartesian coordinate system. The film 40 may be a multilayer reflective polarizer, in which case the x-, y-, and z-axes can be identical to the local x-, y-, and z-axes discussed above. Alternatively, the film 40 may be another optical film or surface, e.g., the front surface of a display system. As shown, film 40 is laid flat, parallel to the x-y plane. The film 40 has opposed major surfaces 40a, 40b exposed to air and disposed perpendicular to the z-axis.

In reference to traditional polarizing films, light can be considered to be polarized in two orthogonal planes, where the electric vector of the light, which is transverse to the propagation direction of the light, lies within a particular plane of polarization. In turn, the polarization state of a given light ray can be resolved into two orthogonal polarization states: p-polarized and s-polarized light. P-polarized ("p-pol") light is light that is polarized in the plane of incidence, the plane of incidence being a plane containing both the local surface normal vector and the light ray propagation direction or vector. FIG. 3 illustrates a light ray 42 that is incident on or emerging from optical film 40 at an oblique angle θ relative to the surface normal (z-axis), thereby forming a "plane of incidence" 44. (For lack of an alternative term, "plane of incidence" will be used herein to refer to the plane containing the surface normal direction and the light propagation direction, both in cases where the light is incident on the film, and in cases where light is not incident on the film but instead is emerging from the film. Likewise, "incidence angle" may be used to refer to the angle between the surface normal direction and the light propagation direction, both for light incident on the film and for light emerging from the film.) If the film 40 is a polarizer, it includes a pass axis 46 parallel to the y-axis and a block axis 48 parallel to the x-axis. The plane of incidence 44 of ray 42 is parallel to the block axis 48. Ray 42 has a p-polarized component that is in the plane of incidence 44, and an s-polarized component that is orthogonal to the plane of incidence 44. The p-pol component of ray 42 is perpendicular to the pass axis 46 and partially aligned with the block axis 48, while the s-polarized ("s-pol") component of ray 42 is parallel to the pass axis 46. FIG. 3 also shows another light ray 50 that is incident on or emerging from optical film 40 at the same oblique angle θ but in a plane of incidence 52 that is parallel to the pass axis 46. In this case, the p-pol component of ray 50 is perpendicular to the block axis 48 and partially aligned with the pass axis 46, while the s-pol component of ray 50 is parallel to the block axis 48.

From this, one can see that depending on the direction of incidence, p-polarized light can be perpendicular to the pass axis in some cases and perpendicular to the block axis in others, and s-polarized light can be parallel to the pass axis in some cases and parallel to the block axis in others. (Any arbitrary plane of incidence can be resolved into the component incidence planes 44, 52.) Thus, a complete discussion of the behavior of s- or p-polarized light for anisotropic systems should include not only the angle of incidence (or e.g. the angle of emergence or angle of observation) of the light, but also the plane of incidence (or e.g. the plane of emergence or plane of observation) of the light.

The gain of two known multilayer reflective polarizer products for p-polarized light was measured, and other characteristics were observed.

The first product, referred to herein as RP1, utilizes polyethylene naphthalate ("PEN") for one of the polymers and a copolymer or blend based upon naphthalene dicarboxylic acid ("coPEN"), in particular a 55/45 copolymer blend that included hexane diol to avoid crystallization, for the other polymer. These polymers are coextruded in an alternating layer arrangement having 275 total layers, and the extrudate is sent through a 1×3 layer multiplier that divides the extrudate and stacks the three extrudate components atop each other, the result being further processed and stretched to produce a finished reflective polarizing film with 825 total microlayers separated into three distinct microlayer packets (275 layers each) with optically thick protective boundary layers (PBLs) therebetween, and optically thick skin layers at the outer major surfaces. In the finished film, the microlayers composed of PEN are birefringent while the microlayers composed of coPEN are substantially isotropic.

The second product, referred to herein as RP2, utilizes a 90/10 copolymer blend based on naphthalene dicarboxylic acid ("coPEN") for one of the polymers and a copolyester (SA115, available from Eastman Chemical Co.) for the other polymer. These polymers are coextruded in an alternating layer arrangement with 275 total layers, and the extrudate is further processed and stretched with a parabolic tenter to produce a finished reflective polarizing film with 275 total microlayers arranged in a single microlayer packet with optically thick skin layers at the outer major surfaces. In the finished film, the microlayers composed of coPEN are birefringent while the microlayers composed of copolyester are substantially isotropic.

Optical properties of these products are approximately as follows:

|  | RP1 | RP2 |
|---|---|---|
| n1x | 1.80 | 1.82 |
| n1y | 1.621 | 1.57 |
| n1z | 1.56 | 1.555 |
| n2x, n2y, n2z | 1.612 | 1.57 |
| $\Delta n_x$ | 0.188 | 0.256 |
| $\Delta n_y$ | 0.009 | (greater than 0 but less than 0.01) |
| $\Delta n_z$ | −0.052 | −0.015 |
| N | 825 | 275 |
| Rpassnormal | 12% | 10% |
| RpassnormalFresnel | 11% | 10% |
| Rblocknormal | 94% | 98% |

In this table, n1x, n1y, n1z, n2x, n2y, n2z, $\Delta n_x$, $\Delta n_y$, and $\Delta n_z$ are as described above. The value "N" is the total number of microlayers in the polarizer. Rpassnormal is the average reflectivity of the film (including both reflectivity from the front and back air/polymer interfaces and reflectivity from the microlayers) over visible wavelengths, e.g., from 400 to 700 nm, for light normally incident on the polarizer and polarized along the pass (y) axis. RpassnormalFresnel is the portion of Rpassnormal attributable to the Fresnel reflectivity of the front and back major surfaces exposed to air. Rblocknormal is the average reflectivity over visible wavelengths, e.g., from 400 to 700 nm, for light normally incident on the polarizer and polarized along the block (x) axis.

Note that RP2 achieves a higher block axis index difference ($\Delta n_x$) than RP1 through a combination of a higher birefringent index n1x and a lower isotropic index n2x. A higher $\Delta n_x$ allows fewer layers to be used for the same block axis reflectivity, with other factors being equal, since normal incidence reflective power increases quadratically with the respective in-plane refractive index difference. Note also that RP1 and RP2 both have very low pass axis index differences ($\Delta n_y$), and low normal incidence pass axis reflectivities. Lower still, however, is the component of the normal incidence pass axis reflectivities attributable to the microlayers, which equals Rpassnormal−RpassnormalFresnel, or about 1% for RP1 and 0% for RP2.

We have investigated the gain characteristics of these reflective polarizing products. Specifically, we investigated the gain as a function of angle for p-pol light in the y-z plane, i.e., the plane containing the pass axis and the surface normal (see plane 52 in FIG. 3). The films were placed on top of a diffusely transmissive hollow light box (a backlight). The diffuse transmission and reflection of the light box can be described as Lambertian. The hollow light box had a diffuse reflectivity of ~83%. The box was illuminated from within using a stabilized broadband light source. A standard linear absorbing polarizer (i.e. an analyzer) was placed between the sample box and the camera detector. The camera detector system was a conoscope made by Autronic-Melchers GmbH (Karlsruhe, Germany). Initially, after allowing the backlight output to stabilize, the luminance of the backlight by itself was measured over a range of observation angles in the horizontal plane. This is the plane that contains the surface normal and the p-polarized pass axis light of the output polarizer, as with plane 52 of FIG. 3. The result is plotted as luminance curve 60 in FIG. 4, where the horizontal axis of the graph is the polar angle in degrees from the surface normal (θ in FIG. 3), and the vertical axis is the measured luminance in nits (nt). As can be seen, the luminance was relatively symmetric with respect to the surface normal, and was relatively constant with angle until θ reached about ±50 degrees, beyond which a drop in luminance was observed.

A flat sheet of RP1 was then placed between the backlight and the analyzer with the pass axis of RP1 aligned with the pass axis of the analyzer, and the measurement repeated. The result is plotted as luminance curve 62. Clearly, the RP1 polarizer increases the luminance of the system greatly over a wide range of observation angles, hence providing significant gain. A secondary feature to note is the gradual rise in luminance with increasing angle out to about ±50 degrees, followed by a drop in luminance for more oblique angles. Recalling that gain is given by the ratio of the luminance of the system with the film (curve 62) to the luminance of the system without the film (curve 60), the reader will readily appreciate that this feature corresponds to a gain peak at the polar angles of about ±50 degrees.

The sheet of RP1 was then removed and replaced with a flat sheet of RP2, oriented in the same manner as RP1, and the measurement repeated. The result is plotted as luminance curve 64. Note again the overall luminance increase relative to the backlight alone. Note also the gradual rise in luminance with increasing angle out to about ±50 to 60 degrees, and a drop in luminance for more oblique angles. Similar to RP1, the polarizer RP2 can also be seen to exhibit a gain peak at the polar angles of about ±50 to 60 degrees by comparing curve 64 to curve 60.

The off-axis gain peaks of the RP1 and RP2 polarizers are due to Brewster angle effects at the outer air/polymer interfaces at the front and back major surfaces of the polarizers. With no anti-reflection coating on the outer surfaces, each of the two air/polymer interfaces contributes a normal incidence (θ=0) reflectivity of about $$R_0 = \left(\frac{n_p - 1}{n_p + 1}\right)^2 \times 100\%,$$

where $n_p$ is the refractive index of the outermost polymer layer (normally one of the materials used in the microlayers) and the refractive index of air is 1. For non-normal incidence, the reflectivity for p-polarized light is close to but less than $R_0$ at small angles θ, decreasing steadily with increasing angle θ until at the Brewster angle $\theta_B$ the p-pol reflectivity is zero. As the incidence angle θ continues to increase beyond $\theta_B$, the p-pol reflectivity increases rapidly with increasing θ.

The off-axis gain peaks of RP1 and RP2 are thus seen to be a consequence of the fact that the pass axis of these polarizers becomes more transmissive (less reflective) in p-polarized light with increasing incidence angle from θ=0 to $\theta_B$ due to Brewster angle effects of the outer air/polymer interfaces. This occurs because the two outer air/polymer interfaces are the primary contributor to the pass axis reflectivity at these incidence angles. The other contributor to the pass axis reflectivity over these angles is the plurality of microlayers within the multilayer film, whose contribution to reflectivity is secondary because $\Delta n_y$ is so small. Of course, $\Delta n_y$ is small for a very good reason—to minimize the pass axis reflectivity and thereby maximize the pass axis throughput.

Regardless of the cause of the off-axis gain peaks, they can be undesirable in applications that call for maximum on-axis gain because they bias the luminance and gain away from the normal.

Figure 4:
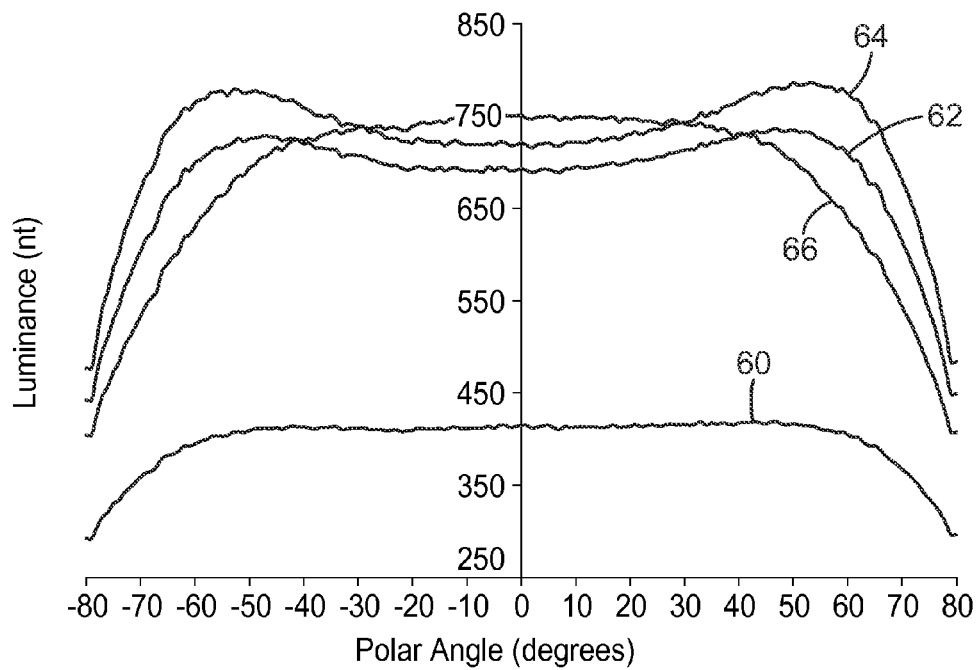
FIG. 4 is a graph of measured luminance versus polar angle of observation for a backlight in combination with various reflective polarizers, from which the angular dependence of gain can be discerned.

We have found that it is possible to substantially eliminate the off-axis gain peaks and increase the on-axis gain while also maintaining low color, all in a simple one-packet film construction, by judicious materials selection, processing, and film design. In exemplary embodiments we achieve this by (1) increasing the pass axis index difference $\Delta n_y$ and the block axis index difference $\Delta n_x$ while maintaining a negative $\Delta n_z$ by, for example, selecting a lower refractive index isotropic material, and (2) preferably limiting the film to a relatively small number of microlayers in a single packet construction. These design features are discussed further below. Curve 66 in FIG. 4 is the measured luminance for a reflective polarizing film embodying these features, discussed in more detail below.

We choose to increase the pass axis reflectivity attributable to the microlayers enough so that the reflectivity increase of the microlayers (for p-pol light) with increasing incidence angle compensates for the reflectivity decrease of the air/polymer interfaces (for p-pol light) with increasing incidence angle, so that the overall reflectivity of the polarizer (for p-pol light) increases monotonically with increasing incidence angle, or so that the reflectivity (for p-pol light) of the microlayers is at least Rpassnormal for light that is incident at the Brewster angle $\theta_B$ of one or both of the air/polymer interfaces, or that the reflectivity (for p-pol light) of the microlayers increases faster than the combined Fresnel reflectivites of the major surfaces decrease. In some cases these conditions can be replaced with a rule-of-thumb that specifies that Rpassnormal is at least 2% more than the combined normal incidence reflectivity of the major surfaces, or that the portion of Rpassnormal attributable to the microlayers is at least 2%. In order for the p-pol pass axis reflectivity of the microlayers to increase with increasing incidence angle, the out-of-plane index difference $\Delta n_z$ should be negative and the in-plane index difference $\Delta n_y$ should be positive, but less than the block axis index difference $\Delta n_x$. These relationships can be summarized by $$\Delta n_x > \Delta n_y > 0 > \Delta n_z$$

Although we increase the pass axis reflectivity, we preferably do not increase it indiscriminately. We wish to keep it low enough to maintain reasonably high pass axis throughput. In some cases, we may increase it only to the extent necessary so that the p-pol reflectivity increase of the microlayers compensates for the p-pol reflectivity decrease of the air/polymer surfaces, as discussed above. In some cases, we may establish a rule-of-thumb that Rpassnormal is no more than 30%, or 25%, or 20%, or 15%. Thus, a balance can be established between increasing the reflectivity enough to compensate for the Brewster angle effects of the outer surfaces and keeping the reflectivity low enough to maintain a reasonably high pass axis throughput and a high on-axis gain.

Figure 5:
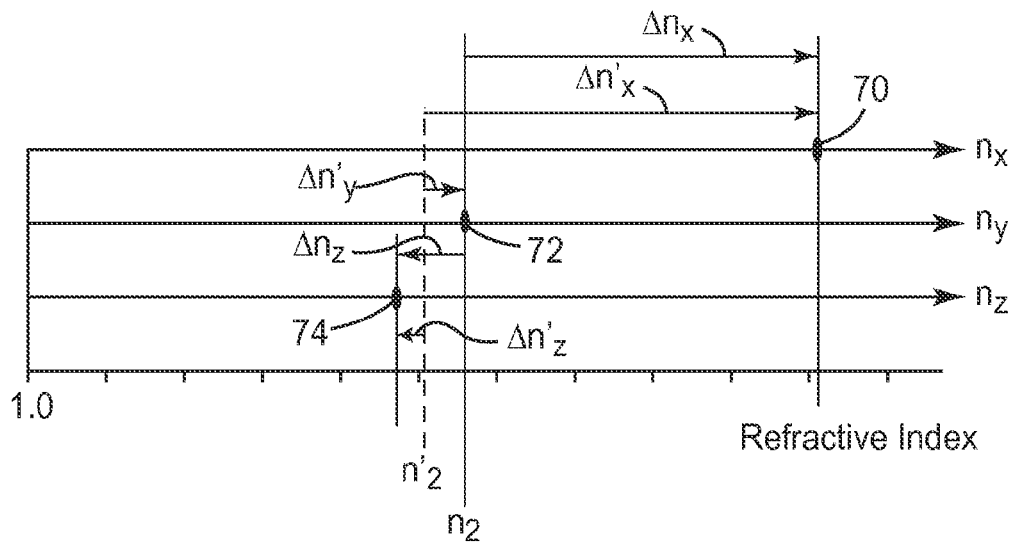
FIG. 5 is a graphical depiction of different combinations of refractive indices for the alternating layers of a multilayer optical film.

FIG. 5 is provided to demonstrate one approach for increasing the in-plane index differences $\Delta n_x$, $\Delta n_y$. In the figure, axes are shown for refractive indices $n_x$, $n_y$, and $n_z$. The axes are separated vertically for clarity but otherwise have the same scale, and a refractive index scale starting at 1.0 (air) is also provided for general reference. Points 70, 72, 74 represent the refractive indices of microlayers composed of the first polymer material, i.e., n1x, n1y, n1z, respectively. The first polymer material is plainly birefringent. A dashed vertical line labeled n2 represents the refractive index of microlayers composed of the second polymer material. The intersection of that line with the $n_x$, $n_y$, and $n_z$ axes yield intersection points (not labeled) that represent n2x, n2y, n2z, respectively, all equal to each other. The second polymer material is isotropic. The combination of points 70, 72, 74 and the line n2 represent a multilayer reflective film comprising alternating birefringent and isotropic microlayers. The first and second polymer materials have been selected and the film has been processed so that the refractive index of the isotropic material matches the y-index of the birefringent material, and so that $$\Delta n_x > \Delta n_y = 0 > \Delta n_z.$$

This combination represents a reflective polarizer with no reflectivity provided by the microlayers at normal incidence for light polarized along the pass axis. Such a film will likely exhibit off-axis gain peaks because the pass axis reflectivity provided by the microlayers will likely not offset the Brewster angle effects of the front and back major surfaces of the polarizer exposed to air.

We can increase the pass axis reflectivity by substituting another isotropic material for the original isotropic material. In doing so, we make sure that the new isotropic material has a lower refractive index than the original, and preferably also that the refractive index n2' of the new isotropic material is greater than n1z (point 74) to maintain a negative $\Delta n_z$, so that the new refractive index differences $\Delta n_x' = n1x - n2'$, $\Delta n_y' = n1y - n2'$, and $\Delta n_z' = n1z - n2'$ satisfy the relation $$\Delta n_x' > \Delta n_y' > 0 > \Delta n_z',$$

where a prime on the parameters indicates the new isotropic material. The new isotropic material preferably of course has material properties that enable it to be coextruded with the polymer material that will become birefringent after orientation.

Note that this technique for increasing the index difference in the y-direction also has the effect of increasing the index differences in the other directions by the same amount. Thus, not only is the original y-index difference $\Delta n_y$ (which equals zero and thus is not shown in FIG. 5) increased by $\Delta n_y'$ to yield a new y-index difference now equal to $\Delta n_y'$; also, the original x-index difference $\Delta n_x$ is increased by the same amount $\Delta n_y'$ to yield $\Delta n_x'$, and the original z-index difference $\Delta n_z$ is increased by the same amount $\Delta n_y'$ to yield a smaller negative value $\Delta n_z'$. The final y-index difference $\Delta n_y'$ in the new construction can in this way be associated with equal refractive index adjustments along all three axes. An added benefit of increasing the x-index difference by the same amount as the y-index difference is increasing the reflective power of the microlayers for the block axis, which can be used to reduce the number of layers required in the microlayer stack for a given block axis target reflectivity. Thus, our approach to eliminating the off-axis gain peaks by increasing the pass axis reflectivity can also help achieve a film with lower overall layer count and simpler design.

Although FIG. 5 is described for a birefringent/isotropic material combination in which alternative isotropic materials are selected, this is not meant to be limiting. For example, the in-plane indices can be increased by keeping the same isotropic material but substituting a different birefringent material, or keeping the same birefringent material but changing the processing conditions (stretch amount, stretch profile, temperature, dwell time, and so forth). Still further, constructions that use two different birefringent materials for the first and second polymer materials are also possible.

Figure 6:
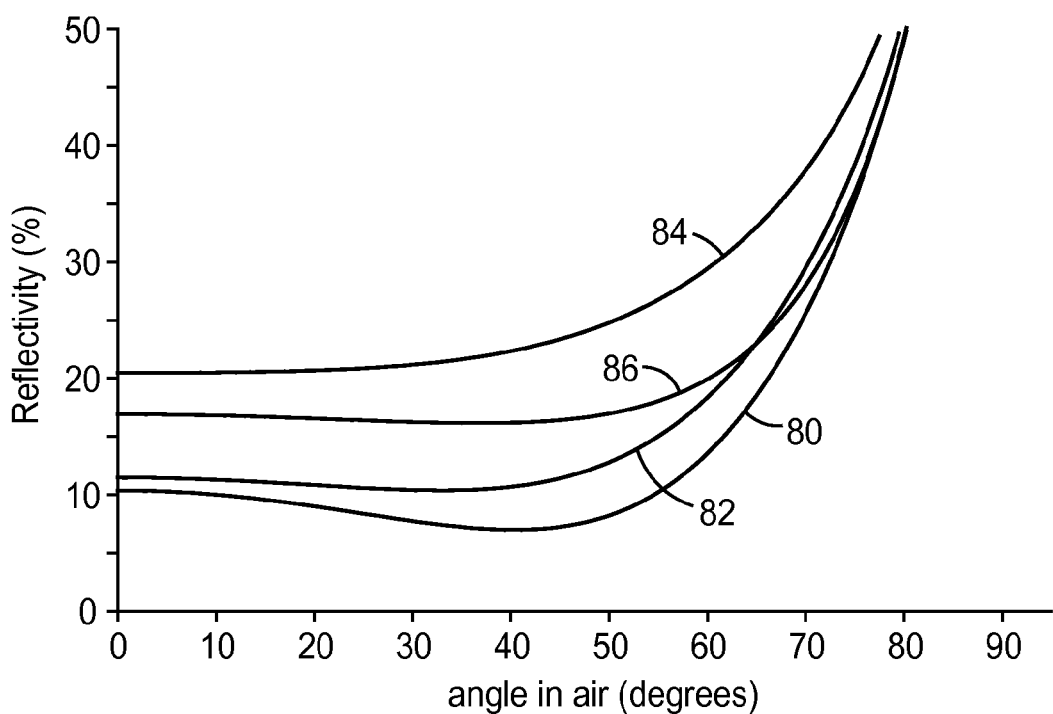
FIG. 6 is a graph of modeled p-pol reflectivity as a function of incidence angle for various multilayer film designs.

Turning now to FIG. 6, we see there modeled reflection curves that demonstrate the technique of increasing the pass axis reflectivity by increasing the reflectivity of the microlayers along the y-axis. Each curve is the calculated reflectivity for particular multilayer reflective polarizer constructions for p-polarized light incident in the y-z plane (see plane 52 of FIG. 3) as a function of incidence angle in air (see $\theta$ in FIG. 3).

Each modeled polarizer construction assumed N total microlayers arranged in a single stack and exposed to air at the outer surface of the first and last microlayer. The N microlayers were arranged in an alternating arrangement of a first and second polymer, with adjacent pairs of the first and second polymer forming optical repeat units with an f-ratio of 50%. The optical repeat units assumed a linear optical thickness profile ranging from 200 nm for the first layer pair (corresponding to a normal incidence reflection peak at 400 nm) to 462 nm for the last layer pair (corresponding to a normal incidence reflection peak at 925 nm). The modeled reflective polarizer constructions, referred to herein as RP6.1, RP6.2, RP6.3, and RP6.4, had the following additional properties:

|  | RP6.1 | RP6.2 | RP6.3 | RP6.4 |
|---|---|---|---|---|
| n1y | 1.61 | 1.61 | 1.61 | 1.61 |
| n1z | 1.505 | 1.505 | 1.505 | 1.505 |
| n2 | 1.61 | 1.595 | 1.564 | 1.564 |
| $\Delta n_y$ | 0 | 0.015 | 0.046 | 0.046 |
| $\Delta n_z$ | 0.105 | 0.09 | 0.059 | 0.059 |
| N | 275 | 275 | 275 | 175 |

The refractive indices in the x-direction have no effect on the modeling and are not listed. The birefringent refractive indices n1y, n1z that were used are representative of 90/10 coPEN oriented at ~145° C. at a stretch ratio of about 5:1 at a strain rate of about 5 m/min. The isotropic refractive indices n2 that were used are representative of coPEN 55/45 (for RP6.1), a blend of 46% 90/10 coPEN and 54% PETG (for RP6.2), and PETG (for RP6.3 and 6.4).

Application of optical modeling software to the polarizer constructions RP6.1 -RP6.4 yielded the respective p-pol reflectivity curves 80, 82, 84, 86 shown in FIG. 6. Inspection of the curves reveals a significant Brewster angle minimum in curve 80 at an incidence angle between 40 and 50 degrees, which produce off-axis gain peaks. Curves 82 and 86 exhibit very slight but almost nonexistent Brewster angle minima. Curve 84 exhibits no Brewster angle minimum. In at least that construction, the increasing reflectivity of the microlayers with incidence angle overcomes the decreasing reflectivity of the two air/polymer surface reflections to yield a net polarizer reflectivity that increases monotonically with increasing incidence angle. Such a film therefore would exhibit no off-axis gain peaks. Comparison of curves 84 and 86 demonstrates the effect of changing the layer number N of microlayers.

The modeling result of curve 84 was confirmed by fabricating a film having substantially the characteristics described above for the RP6.3 construction. A 90/10 coPEN (the birefringent material in the finished film) and PETG (the isotropic material in the finished film) were coextruded using a 275 layer feedblock and film-making equipment similar to that described in U.S. Pat. No. 6,783,349 (Neavin et al.), except that no layer multiplier device was used. The layer thickness profile of the 275 layers was controlled to substantially match a target monotonic optical thickness profile using an axial rod heater disposed in the feedblock, whose temperature profile was dynamically adjusted along its length during coextrusion to maintain the target layer thickness profile with little deviation. The finished polarizing film, referred to herein as RP6.3A, included an optically thick skin layer composed of PETG at both the front and back of the microlayer packet, the skin layers forming the outermost layers of the film exposed to air.

A sheet of the RP6.3A film was placed atop the backlight referred to in connection with FIG. 4 in the same manner as films RP1 and RP2, and the resulting luminance was measured in the same way. The measured luminance is shown in curve 66 of FIG. 4.

Unlike curves 62 and 64, curve 66 has no off-axis gain peaks and has a maximum gain at substantially normal incidence. Moreover, the normal incidence gain is greater for RP6.3A than for the commercial products RP1 and RP2, despite the increased normal incidence pass axis reflectivity. The RP6.3A film was also inspected for on-axis and off-axis color, and it was found to be within acceptable limits due to the careful layer thickness control during fabrication.

As mentioned above, the polarizer film RP6.3A was fabricated without the use of a layer multiplier. Although layer multipliers can simplify the generation of a large number of optical layers, they may impart small distortions to each resultant packet of layers that are not identical for each packet. For this reason, any adjustment in the layer thickness profile of the layers generated in the feedblock is not the same for each packet, i.e., all packets produced by the multiplier cannot be simultaneously optimized to produce a uniform smooth spectrum free of spectral disruptions. Thus, an optimum profile and low transmission color polarizer can be difficult to make using multi-packet films manufactured using multipliers. If the number of layers in a single packet generated directly in a feedblock do not provide sufficient reflectivity, then two or more such films (fabricated without any layer multipliers) can be attached to increase the reflectivity. Note, however, that the reflectivity obtained by adhering two multilayer packets together (the total number of microlayers in the packets being N) with an optically thick adhesive, or other material, is less desirable than the reflectivity obtained by a single packet of N microlayers, as demonstrated in FIG. 7 below. The physical separation of the two packets in the former design results in the incoherent summation of the individual reflectivities of the packets, even though each packet individually is coherent. The single packet design can provide a higher block axis reflectivity for a given pass axis reflectivity, or can provide a lower pass axis reflectivity for a given block axis reflectivity, than the two packet design. Related discussion of film fabrication techniques, including axial rod heater control, can be found in U.S. Patent Application No. 60/939,079 (Attorney Docket No. 63274US002), filed May 20, 2007 and incorporated herein by reference.

Increasing the pass axis reflectivity by increasing $\Delta n_y$ is counter to the normal polarizer design rules of maximizing the throughput of the pass axis. It also presents challenges with respect to on-axis and off-axis color. As mentioned earlier, at intermediate reflectivities, even very small variations in the layer thickness profile of the stack, relative to an ideal or target thickness profile, can easily produce spectral deviations from a target flat reflection spectrum that can be readily perceived as color by the human eye in transmitted or reflected light. The increased importance of layer thickness control leads us to preferred film designs that are compatible with fabrication methods that avoid the use of layer multipliers, for the reasons given above. Without a layer multiplier, the number of microlayers in the finished product substantially equals the number of layers that are coextruded from the feedblock. Given practical limits to feedblock design, this in turn leads us to seek film constructions that can function with a relatively small total number (N) of microlayers. This also has the benefit of films that are physically thin, which may be beneficial in certain applications.

We therefore now turn our attention to the number of microlayers (N) used in the reflective polarizer design, and to the distribution of those microlayers within the film (e.g., single coherent packet, versus multiple packets separated by optically thick protective boundary layers). We have already seen in FIG. 6, by comparing curves 84 and 86, that N can be an important factor along with the y-index difference in whether off-axis gain peaks are observed.

Figure 7:
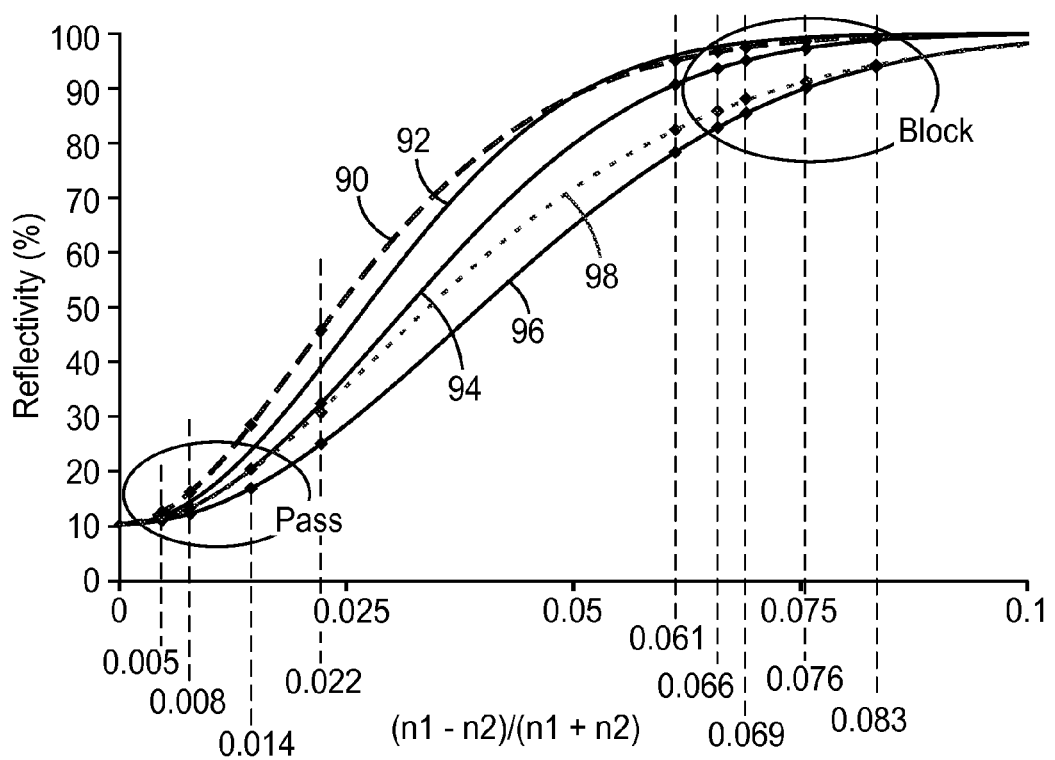
FIG. 7 is a graph of modeled on-axis reflectivity as a function of normalized in-plane refractive index difference for various multilayer film designs.

FIG. 7 plots calculated reflectivity at normal incidence for various modeled multilayer film designs as a function of the refractive index difference between alternating microlayers. The model is not concerned with 2-dimensional film characteristics, and thus the refractive indices n1, n2 used in the model can represent any in-plane refractive index of the alternating layers, whether the x-axis or the y-axis refractive indices. The z-axis refractive indices are unimportant because they have no effect on normal-incidence behavior. On-axis reflectivity is plotted on the vertical axis and normalized refractive index difference (n1−n2)/(n1+n2) is plotted on the horizontal axis.

Several stack designs were modeled. All designs were constrained to reflect in a wavelength band extending from 400 to 925 nm. A first stack design ("SD1") used 550 total layers (N=550) that were arranged into two equal packets of 275 microlayers separated by an optically thick index matching medium. A second stack design ("SD2") used 375 total layers (N=375) arranged in a single coherent multilayer stack. A third stack design ("SD3") used 275 total layers (N=275) arranged into a single coherent multilayer stack. A fourth stack design ("SD4") used 175 total layers (N=175) arranged into a single coherent multilayer stack. A fifth stack design ("SD5") used two packets of 138 microlayers each (N=276), separated by an index matching optically thick medium. (Results for the SD5 design can be compared to results for the SD3 design to ascertain the effect of arranging substantially the same number of microlayers into a single coherent packet versus into two packets that are individually coherent but mutually incoherent.) Each design incorporated a front and back surface of the overall construction exposed to air, producing Fresnel reflectivity. Each design also assumes a monotonic layer thickness gradient tailored to produce a normal incidence reflection band from 400 to 925 nm. Dispersion and absorption were neglected, and the calculated reflectivities represent averages from 400 to 700 nm, and they also represent averages from 400 to 925 nm.

The refractive indices of these stack designs were then allowed to vary. Initially, n1 and n2 were both set equal to 1.610. The value n1 was then increased up to 1.82 and beyond, and the reflectivity calculated for each layer design/refractive index combination. The curves 90, 92, 94, 96, 98 are the calculated reflectivities for the film designs SD1, SD2, SD3, SD4, SD5 respectively. Small refractive index differences yield small values of normalized index difference, representative of pass-axis behavior and labeled as a "Pass" region in the figure. Larger refractive index differences yield larger values of normalized index difference, representative of block-axis behavior and labeled as a "Block" region. A number of specific material combinations are also represented on the graph as individual points. The table below shows refractive index differences and normalized refractive index values (pass axis and block axis) for various low index isotropic materials having index n2 when combined with a high index birefringent 90/10 coPEN material (having $n1_x=1.82$, $n1_y=1.61$, $n1_z=1.505$):

|  | n2 | $\Delta n_x$ | $\Delta n_y$ | $\Delta n_z$ | Normalized index diff (pass) | Normalized index diff (block) |
|---|---|---|---|---|---|---|
| 55:45 coPEN | 1.610 | 0.21 | 0 | −0.105 | 0 | 0.061 |
| 75:25 coP:PETG | 1.595 | 0.225 | 0.015 | −0.09 | 0.005 | 0.066 |
| 50:50 coP:PETG | 1.585 | 0.235 | 0.025 | −0.08 | 0.008 | 0.069 |
| PETG | 1.564 | 0.256 | 0.046 | −0.059 | 0.014 | 0.076 |
| coPET-f | 1.540 | 0.28 | 0.07 | −0.035 | 0.022 | 0.083 |

These respective normalized refractive differences are labeled in FIG. 7 to enable identification of the individual points on the respective curves representing these material combinations. For example, each of the curves 90-96 has an individual datapoint at a normalized index difference value ((n1−n2)/(n1+n2)) of 0.022, corresponding to the index difference along the pass axis for the material combination 90/10 coPEN and coPET-f, and each of the curves 90-98 also has an individual datapoint at a normalized index difference value of 0.083, corresponding to the index difference along the block axis for the same 90/10 coPEN–coPET-f material combination.

FIG. 7 thus shows how normal incidence reflectivity increases with changes in the in-plane index difference, for both the pass (y) and block (x) axes, and for different microlayer stack designs. The highest slope for the pass axis increase in reflectivity occurs for SD1, the 2-packet system with individual coherent packets of 275 layers laminated and reflecting in a non-constructive interference arrangement. This 2-packet construction also has the smallest increase in block axis reflectivity for a given in-plane index difference, similar to the 375 layer coherent stack design of SD2. The smallest slope for the pass axis increase in reflectivity occurs for SD4, and this stack design also has the highest increase in slope for the block axis, i.e., most improvement for a given in-plane index difference.

Comparison of curves 94, 96, 98 is instructive with respect to the desirability of distributing the available microlayers in a single coherent packet rather than separating them into multiple packets. The pass axis reflectivity for curve 98 (two packets, total N=276) is substantially the same as that for curve 94 (single packet, N=275), but the block axis reflectivity for curve 98 is closer to that for curve 96 (single packet, N=175) than to curve 94. Thus, given the same total number of microlayers, a single packet design can provide a higher block axis reflectivity for a given pass axis reflectivity, or can provide a lower pass axis reflectivity for a given block axis reflectivity, than a two packet design.

Selection of PETG as the low index isotropic material has the effect of increasing the in-plane index differences (both pass axis and block axis) by 0.046 relative to a construction having a perfect index match along the pass axis (using 55/45 coPEN as the low index isotropic material). These increased in-plane index differences produce a 10% increase in pass axis reflectivity and a 6.6% increase in block axis reflectivity for stack design SD3 (275 layers, single stack—curve 94), but they produce a smaller 6.5% increase in pass axis reflectivity and a larger 11.7% increase in block axis reflectivity for stack design SD4 (175 layers, single stack—curve 96). The smaller increase in pass axis reflectivity is beneficial for a polarizing film in maintaining a higher pass axis throughput, and the larger increase in block axis reflectivity is beneficial in keeping the loss/leakage of useable polarization low.

Figure 8:
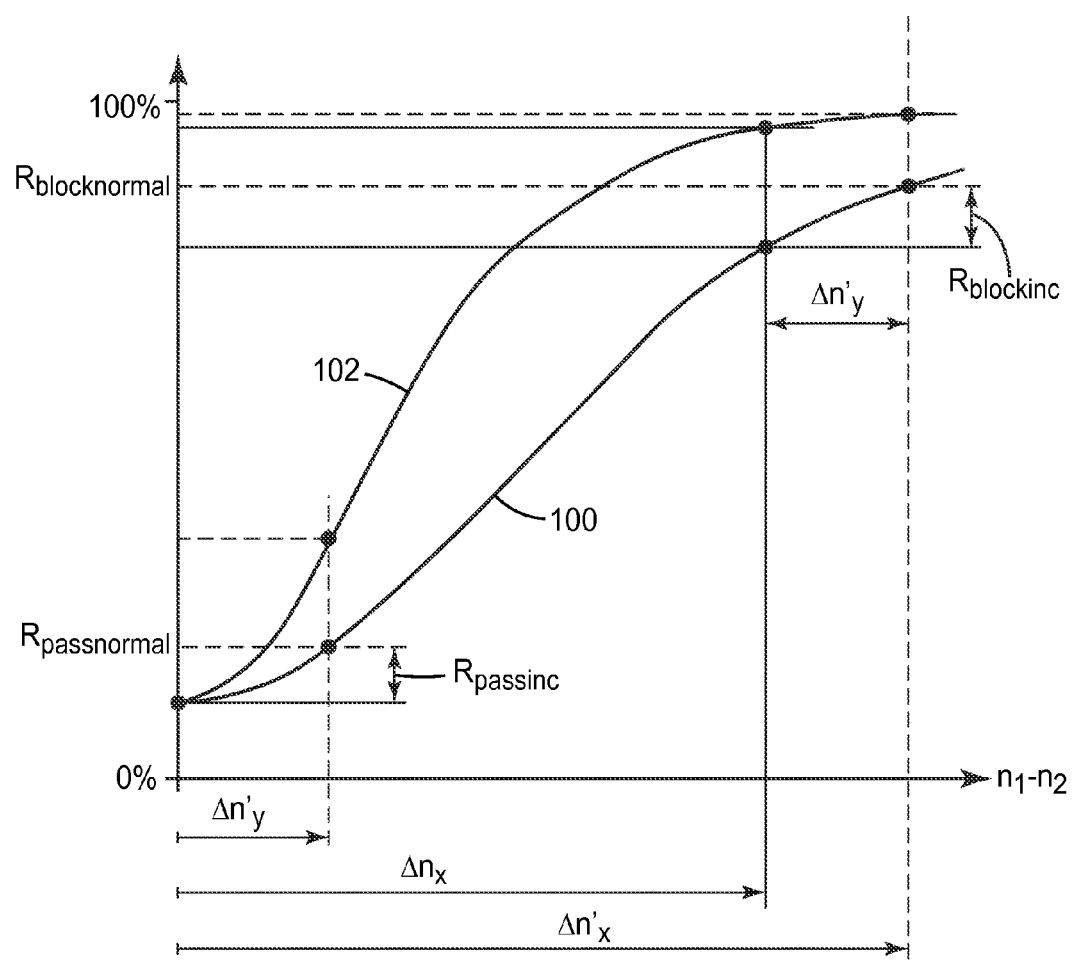
FIG. 8 is a graph that summarizes results of FIG. 7.

FIG. 8 is a graph that summarizes the lessons of FIG. 7 in a similar but simplified format, and that graphically depicts the parameters Rpassnormal, Rblocknormal, Rpassinc, and Rblockinc Normal incidence reflectivity is plotted against in-plane index difference n1−n2, where small values of the index difference represent the pass axis and larger values represent the block axis. Two curves are shown, a lower curve 100 and an upper curve 102, the features of which are intended to demonstrate general trends. The lower curve 100 can represent a microlayer stack design with relatively fewer microlayers N than an alternative stack design for curve 102, each of the stack designs being single packet designs that reflect over the same wavelength band. Alternatively, lower curve 100 can represent a microlayer stack design having the same number of microlayers N as that of curve 102, but the stack for curve 100 has the microlayers configured as a single coherent packet whereas the stack for curve 102 has the microlayers divided into two packets separated by an optically thick index matching material (and again each of the stack designs have a thickness gradient causing them to reflect over the same wavelength band).

We select a polymer material combination and processing conditions that produce a pass axis refractive index difference of $\Delta n_y'$ and a block axis refractive index difference of $\Delta n_x'$. These values help contribute (along with Fresnel reflectivity of the front and back surfaces of the reflective polarizer) to a pass axis reflectivity at normal incidence of Rpassnormal, and a block axis reflectivity at normal incidence of Rblocknormal. In the figure, Rpassnormal and Rblocknormal are only labeled for the lower curve 100 to avoid confusion, but corresponding datapoints are also shown for the upper curve 102. These reflectivities can be compared to corresponding reflectivities one would obtain for the same stack design if a different low index isotropic material were used, one that would cause the pass axis refractive index difference to drop to zero (and that would cause the block axis refractive index difference to drop by the same amount). Both $\Delta n_y'$ and $\Delta n_x'$ are thus decreased by the amount $\Delta n_y'$, yielding a new $\Delta n_y$ of zero and a smaller $\Delta n_x$ as shown. The resulting new reflectivity for the pass axis is smaller than Rpassnormal by an amount Rpassinc, and the resulting new reflectivity for the block axis is smaller than Rblocknormal by an amount Rblockinc. For the preferred stack design (curve 100), Rblockinc is comparable to Rpassinc. For example, Rblockinc may be at least half of Rpassinc, or Rblockinc may be at least equal to Rpassinc.

FIGS. 7 and 8 help to illustrate the physics of pass and block axis reflectivity increases and demonstrate that coherent multilayer stacks are advantageous, but it is also useful to calculate the expected gain for the different cases in a typical high efficiency commercial backlight. This was done and the results plotted in FIGS. 9a and 9b. A recycling model was used in which all reflected light was assumed to be randomized in the backlight, both in polarization and in angle of propagation. This is a good approximation for backlights that are constructed with voided polyester reflectors that are commonly used in existing commercial backlights.

A number of film stacks were modeled, each one using the same high index birefringent 90/10 coPEN material mentioned above, having n1x=1.82, n1y=1.61, and n1z=1.505 when properly oriented. A baseline design for comparison purposes used a low index isotropic polymer material of index equal to 1.61 to drive the y-index mismatch $\Delta n_y$ to zero. In the model, we include this embodiment, but then we also model a range of alternative embodiments for which the isotropic index ranges from 1.61 to 1.51, and we calculate both the on-axis gain and the total (hemispheric integrated) gain for polarized light delivered to an LCD panel. The model assumed an absorption loss of 1% for all the films, and a backlight cavity efficiency of 90% (10% average total loss for rays entering the backlight cavity).

The film stacks that were modeled were the stack designs SD1 (two packets of 275 layers each), SD2 (one packet of 375 layers), SD3 (one packet of 275 layers), SD4 (one packet of 175 layers), and a packet design ("SD5") having two packets of 138 microlayers each, separated by an index matching optically thick medium. The SD5 packet design, like the others, included a layer thickness profile causing it to reflect over the wavelength band from 400 to 925 nm). Results for the SD5 design thus can be compared to results for the SD3 design to ascertain the effect of arranging substantially the same number of microlayers into a single coherent packet versus into two packets that are individually coherent but mutually incoherent.

Figure 9A:
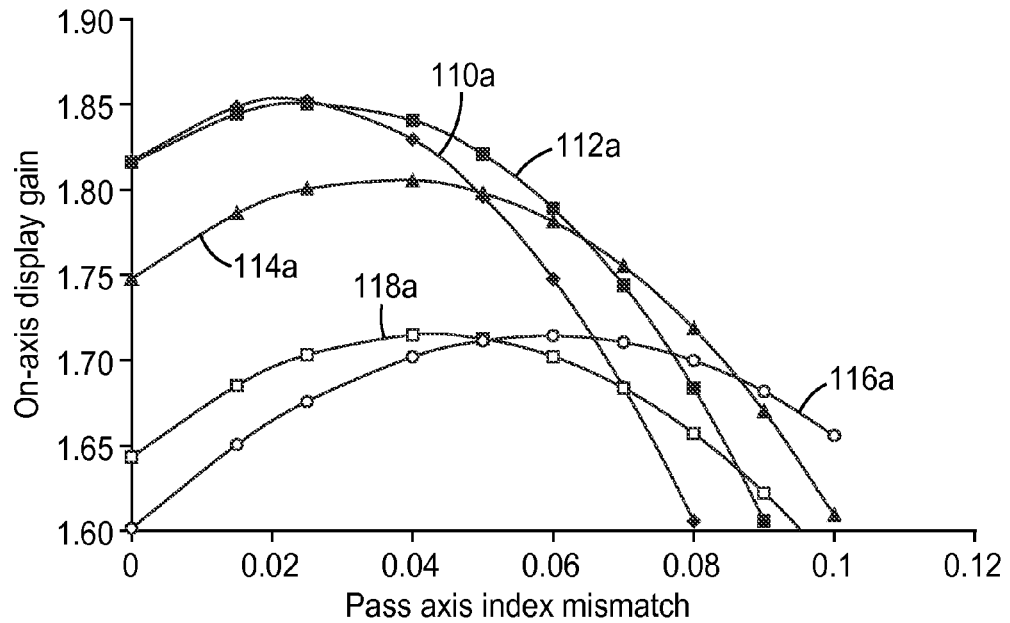
FIG. 9a is a graph of modeled on-axis gain as a function of the y-index mismatch of various multilayer film designs.
Figure 9B:
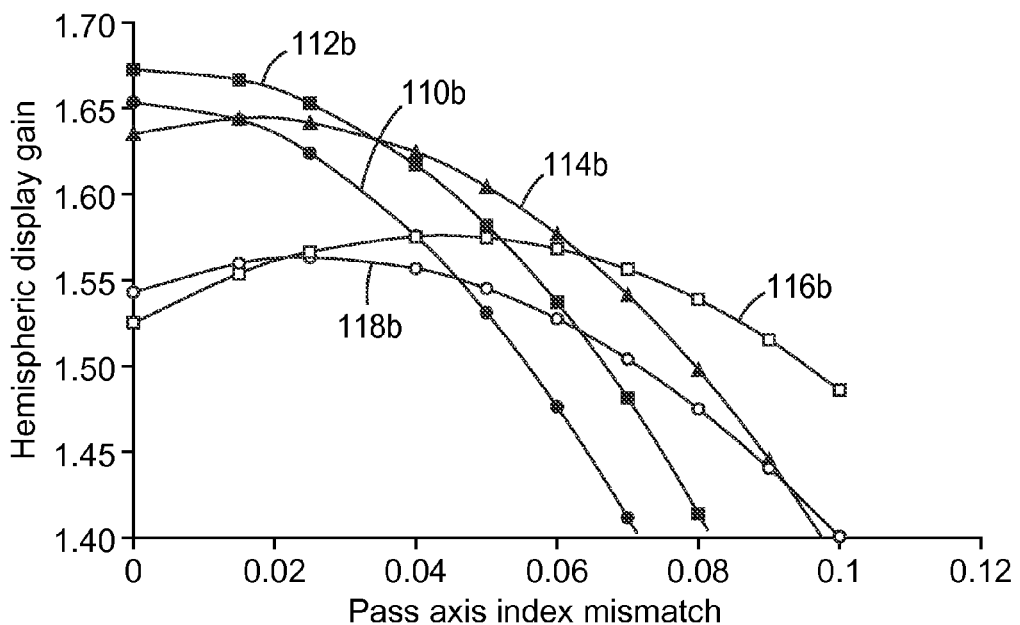
FIG. 9b is a graph of modeled hemispheric gain as a function of the y-index mismatch of the various multilayer film designs.

The results are shown in FIGS. 9a (for modeled on-axis gain) and 9b (for modeled hemispheric gain). The horizontal axis for each graph is the pass axis refractive index difference $\Delta n_y$, but it is to be understood that as $\Delta n_y$ varies from 0 to 0.1, the block axis difference varies in a corresponding fashion from 0.21 to 0.31, and the out-of-plane (z-axis) difference varies correspondingly from −0.105 to −0.005. In this regard, for convenience, one may express the results in terms of an independent parameter $\Delta\Delta n$ that is added to or subtracted from each of the x, y, and z refractive index differences of a particular baseline embodiment equally, where in this case the baseline embodiment for the respective stack designs may be those embodiments using the 90/10 coPEN material as the birefringent polymer and the 1.61 index material as the isotropic polymer. Curves 110a and 110b are for stack design SD1, curves 112a and 112b are for stack design SD2, curves 114a and 114b are for stack design SD3, curves 116a and 116b are for stack design SD4, and curves 118a and 118b are for stack design SD5. Note that the gain per layer is higher for the single packet coherent stacks compared to the 2-packet laminates of individual coherent stacks. The overall maximum gain is generally achieved with highest layer count, but this requires the greatest amount of PEN resin content and complexity of the feedblock needed to control the layer profiles to avoid perceived color. For each particular stack design, the gain is seen to reach a maximum at a certain value of $\Delta n_y$ (or of $\Delta\Delta n$) and then decrease. Preferably, $\Delta n_y$ (or $\Delta\Delta n$) is selected, via appropriate material selection and processing conditions, to maximize or substantially maximize the gain for the stack design chosen. For example, if a maximum gain is achieved with a particular value of $\Delta n_y$ or $\Delta\Delta n$, then $\Delta n_y$ or $\Delta\Delta n$ is preferably selected sufficiently close to that particular value to achieve a gain that is at least 90% or 95% of such maximum gain. In many of the stack designs, hemispheric or on-axis gain is maximized for $\Delta n_y$ in a range from 0.01 to 0.06, or from 0.01 to 0.05.

Thus, an optimum number of layers can be chosen to maximize gain with respect to cost, for example. The optimum layer count for films having a high index layer having nx=1.82 is in the range from 150 to 400 layers, preferably in a range from 200 to 300, 250 to 350, or 275 to 325, or the like, depending on customer expectations for cost and performance. The optimization procedure can also be applied to films having birefringent indices lower than those for PEN, e.g., to pure PET based birefringent materials. PET is generally lower cost than PEN, but requires more layers due to the smaller index differences typically achievable and thus also slower line speeds. Accordingly, if some of the microlayers comprise polyethylene terephthalate or a copolymer thereof, then N is preferably 800 or less, or 650 or less, or in a range from 300 to 650, or in a range from 500 to 650.

Reflectivities of the foregoing films are generally reflectivity averages over the visible spectrum, 400-700 nm, but other ranges can also be used. Rpassnormal, Rblocknormal, Rpassinc, and Rblockinc, for example, may thus represent reflectivity averages, but they may also represent reflectivity averages that extend into the infrared region (e.g. 400-925 nm) to ensure adequate off-axis performance.

The reflectivity of the multilayer films may be difficult to measure at oblique angles, such as at a Brewster angle, especially if the film has some surface structure or diffuser added to it. In those cases it is simpler to use the following procedure, using the well known relationship that R=1−T−A where A is the absorption and R and T are measured in an integrating sphere. Instruments such as the Perkin Elmer Lambda 900 or Lambda 950 are suitable for this measurement. First determine A by measuring $R_{norm}$ and $T_{norm}$ at near normal incidence. Then measure $T_{oblique}$ at the desired oblique angle such as at the air/polymer surface Brewster angle. The reflectivity then is given by $R_{oblique}=1-T_{oblique} A$. The value of A may be slightly different at oblique angles and corrections may be made if desired. Near 55 degrees however the corrections are minor. Measurements of $T_{oblique}$ are difficult to measure with an integrating sphere if there is substantial diffusion in the film. In addition, diffusers can increase the absorption of a film. In order to remove measurement error due to the presence of diffusers, a diffuse layer may be smoothed over by a coating or by a laminate if it is a surface diffuser, or it may be stripped away e.g. by polishing or by laser ablation if it is a bulk diffuser incorporated in an outer layer of the film such as a skin layer or a protective boundary layer.

Unless otherwise indicated, all numbers expressing quantities, measurement of properties and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The foregoing description is illustrative and is not intended to limit the scope of the invention. Variations and modifications of the embodiments disclosed herein are possible, and practical alternatives to and equivalents of the various elements of the embodiments will be understood to those of ordinary skill in the art upon study of this patent document. These and other variations and modifications of the disclosed embodiments may be made without departing from the spirit and scope of the invention.

The invention claimed is:

1. A reflective polarizer having a block axis and a pass axis corresponding respectively to an x-axis and a y-axis, the reflective polarizer comprising:
    first and second opposed major surfaces exposed to air and therefore exhibiting Brewster angle reflection minima, the major surfaces being disposed perpendicular to a z-axis which is itself perpendicular to the x- and y-axes, the z-axis and the y-axis forming a y-z plane; and
    a stack of microlayers disposed between the major surfaces and arranged into pairs of adjacent microlayers that exhibit refractive index differences along the x-, y-, and z-axes of $\Delta nx$, $\Delta ny$, and $\Delta nz$ respectively, where $\Delta nx > \Delta ny > 0 > \Delta nz$, the stack having a total number N of such microlayers;
    wherein the number N and the index difference $\Delta nx$ in combination are large enough to provide the polarizer with a high reflectivity for normally incident light polarized along the x-axis, said high reflectivity referred to as Rblocknormal, Rblocknormal being at least 80%;
    wherein the number N and the index difference $\Delta ny$ in combination are small enough to provide the polarizer with a low reflectivity for normally incident light polarized along the y-axis, said low reflectivity reffered to as Rpassnormal, Rpassnormal being 25% or less;
    wherein the number N and the index difference $\Delta ny$ in combination are large enough so that the reflective polarizer exhibits a reflectivity greater than Rpassnormal for p-polarized light incident in the y-z plane at the Brewster angle of a first major surface of said major surfaces; and
    wherein $\Delta ny$ is responsible for an incremental portion Rpassinc of Rpassnormal, and a corresponding portion of $\Delta nx$ equal to $\Delta ny$ is responsible for an incremental portion Rblockinc of Rblocknormal, and the number N is small enough so that Rblockinc is at least half of Rpassinc, and wherein Rpassnormal, Rpassinc, Rblocknormal, and Rblockinc are all average over a same wavelength range.

2. The polarizer of claim 1, wherein Rblockinc is at least Rpassinc.

3. The polarizer of claim 1, wherein Rblocknormal is at least 90%.

4. The polarizer of claim 1, wherein Rblocknormal is at least 95%.

5. The polarizer of claim 1, wherein Rpassnormal is 20% or less.

6. The polarizer of claim 1, wherein Rpassnormal is 15% or less.

7. The polarizer of claim 1, wherein Rpassnormal is at least 2% more than a combined normal incidence reflectivity of the major surfaces.

8. The polarizer of claim 1, wherein the reflective polarizer provides a gain when inserted into a backlight cavity, and wherein the gain is substantially maximized with respect to a parameter $\Delta\Delta n$ that can be used to increase or decrease the refractive index differences $\Delta nx$, $\Delta ny$, $\Delta nz$ equally.

9. The polarizer of claim 8, wherein a particular value of the parameter $\Delta\Delta n$ achieves a maximum gain, and wherein the refractive index differences $\Delta nx$, $\Delta ny$, $\Delta nz$ provide a gain that is at least 90% of the maximum gain.

10. The polarizer of claim 8, wherein the gain is an on-axis gain or a hemispheric gain.

11. The polarizer of claim 1, wherein the stack of microlayers includes all microlayers disposed between the major surfaces.

12. The polarizer of claim 1, wherein at least some of the microlayers comprise polyethylene naphthalate or a copolymer thereof, and N is in a range from 275 to 325.

13. The polarizer of claim 1, wherein the number N and the index difference $\Delta ny$ in combination are large enough so that the reflective polarizer exhibits a reflectivity for p-polarized light incident in the y-z plane that monotonically increases with incidence angle relative to the z-axis.

14. The polarizer of claim 1, further comprising a mechanically reinforcing substrate attached to the polarizer with an adhesive, the reinforcing substrate having a structured surface that provides light diffusion or collimation.

15. The polarizer of claim 1, wherein Rblocknormal, Rpassnormal, Rblockinc, and Rpassinc are all averages over a wavelength range from 400 to 700 nm.

16. The polarizer of claim 1, wherein Rblocknormal, Rpassnormal, Rblockinc, and Rpassinc are all averages over a wavelength range from 400 to 925 nm.

17. A reflective polarizer having a block axis and a pass axis corresponding respectively to an x-axis and a y-axis, the reflective polarizer comprising:
   first and second opposed major surfaces exposed to air and therefore exhibiting Brewster angle reflection minima, the major surfaces being disposed perpendicular to a z-axis which is itself perpendicular to the x- and y-axes, the z-axis and the y-axis forming a y-z plane; and
   a stack of microlayers disposed between the major surfaces and arranged into pairs of adjacent microlayers that exhibit refractive index differences along the x-, y-, and z-axes of $\Delta nx$, $\Delta ny$, and $\Delta nz$ respectively, where $\Delta nx > \Delta ny > 0 > \Delta nz$, the stack having a total number N of said microlayers, and wherein the microlayers are arranged into optical repeat units each of which has an optical thickness, the optical repeat units being arranged to provide a substantially monotonic optical thickness profile;
   wherein the reflective polarizer has a high reflectivity Rblocknormal for normally incident light polarized along the x-axis, and a low reflectivity Rpassnormal for normally incident light polarized along the y-axis, Rblocknormal being at least 80%, and Rpassnormal being less than 25% but at least 2% more than a combined normal incidence reflectivity of the major surfaces; and
   wherein the reflective polarizer exhibits an average reflectivity, over a wavelength range, greater than Rpassnormal for p-polarized light incident in the y-z plane at the Brewster angle of a first major surface of said major surfaces, and wherein Rblocknormal and Rpassnormal are averages over the wavelength.

18. The polarizer of claim 17, wherein at least some of the microlayers comprise polyethylene naphthalate or a copolymer thereof, and N is 350 or less.

19. The polarizer of claim 18, wherein N is 300 or less.

20. The polarizer of claim 18, wherein N is in a range from 250 to 350.

21. The polarizer of claim 18, wherein N is in a range from 275 to 325.

22. The polarizer of claim 17, wherein at least some of the microlayers comprise polyethylene terephthalate or a copolymer thereof, and N is 800 or less.

23. The polarizer of claim 22, wherein N is 650 or less.

24. The polarizer of claim 22, wherein N is in a range from 300 to 650.

25. The polarizer of claim 22, wherein N is in a range from 500 to 650.

26. The polarizer of claim 17, wherein the stack of microlayers includes all microlayers disposed between the major surfaces.

27. The polarizer of claim 17, wherein $\Delta nx$ is at least 0.2 and $\Delta ny$ is less than 0.05.

28. The polarizer of claim 17, wherein the major surfaces have a combined reflectivity for p-polarized light incident in the y-z plane that decreases with increasing incidence angle and wherein the stack of microlayers has a reflectivity for such light that increases with increasing incidence angle faster than the combined reflectivity of the major surfaces decreases, so as to provide the reflective polarizer with a monotonic increase in reflectivity for p-polarized light incident in the y-z plane.

29. The polarizer of claim 17, further comprising a mechanically reinforcing substrate attached to the polarizer with an adhesive, the reinforcing substrate having a structured surface that provides light diffusion or collimation.

30. The polarizer of claim 17, wherein Rblocknormal and Rpassnormal are both averages over a wavelength range from 400 to 700 nm.

31. The polarizer of claim 17, wherein Rblocknormal and Rpassnormal are both averages over a wavelength range from 400 to 925 nm.

32. A. method of making a reflective polarizer having a block axis and a pass axis corresponding respectively to an x-axis and a y-axis, the method comprising:
   selecting a first and second polymer material;
   coextruding the polymer materials to provide a polymer film having opposed major surfaces exposed to air, the major surfaces being disposed perpendicular to a z-axis which is itself perpendicular to the x- and y-axes, the z-axis and the y-axis forming a y-z plane, the polymer film including a stack of layers disposed between the major surfaces, the stack having a total number N of said layers, the layers including layers of the first polymer material interleaved with layers of the second polymer material; and
   orienting the polymer film to convert the stack of layers to a stack of microlayers, the microlayers in the stack also having the total number N and arranged into pairs of adjacent microlayers that exhibit refractive index differences along the x-, y-, and z-axes of $\Delta nx$, $\Delta ny$, and $\Delta nz$ respectively, such that $\Delta nx > \Delta ny > 0 > \Delta nz$;
   selecting the number N and the index difference $\Delta nx$ in combination to be large enough to provide the polarizer with a high reflectivity for normally incident light polarized along the x-axis, said high reflectivity referred to as Rblocknormal, Rblocknormal being at least 80%;
   selecting the number N and the index difference $\Delta ny$ in combination to be small enough to provide the polarizer with a low reflectivity for normally incident light polarized along the y-axis, said low reflectivity referred to as Rpassnormal, Rpassnormal being 25% or less;
   selecting the number N and the index difference $\Delta ny$ in combination to be large enough so that the reflective polarizer exhibits a reflectivity greater than Rpassnormal for p-polarized light incident in the y-z plane at the Brewster angle of a first major surface of said major surfaces; and
   selecting the number N to be small enough such that an incremental portion Rblockinc of Rblocknormal is at least half of an incremental portion Rpassinc of Rpassnormal, where $\Delta ny$ is responsible for the incremental portion Rpassinc, and a corresponding, portion of $\Delta nx$ equal to $\Delta ny$ is responsible for the incremental portion Rblockinc of Rblocknormal, and wherein Rpassnormal, Rpassinc, Rblocknormal, and Rblockinc are all averages over a same wavelength range.

33. The method of claim 32, wherein the reflective polarizer provides a gain when inserted into a backlight cavity, and wherein at least the selecting the first and second polymer materials, the coextruding, and the orienting steps are carried out to substantially maximize the gain with respect to a parameter $\Delta\Delta n$, wherein the refractive index differences $\Delta nx$, $\Delta ny$, $\Delta nz$ can all be equally increased or decreased by the parameter $\Delta\Delta n$.

34. The method of claim 33, wherein a particular value of the parameter $\Delta\Delta n$ achieves a maximum gain, and wherein at least the selecting the first and second polymer materials, the coextruding, and the orienting steps are carried out to provide a gain that is at least 90% of the maximum gain.

35. The method of claim 32, wherein at least the first polymer material comprises polyethylene naphthalate or a copolymer thereof, and N is in a range from 275 to 325.

36. The method of claim 32, wherein after the orienting step, the stack of microlayers includes all microlayers disposed between the major surfaces.

37. The method of claim 32, wherein after the orienting step, microlayers comprising the first polymer material are birefringent and microlayers comprising the second polymer material are isotropic.

38. The method of claim 32, wherein Rblocknormal, Rpassnormal, Rblockinc, and Rpassinc are all averages over a wavelength range from 400 to 700 nm.

39. The method of claim 32, wherein Rblocknormal Rpassnormal, Rblockinc, and Rpassinc are all averages over a wavelength range from 400 to 925 nm.

* * * * *

UNITED STATES PATENT AND TRADEMARK OFFICE
CERTIFICATE OF CORRECTION

Page 1 of 1

PATENT NO. : 9,110,245 B2
APPLICATION NO. : 12/935500
DATED : August 18, 2015
INVENTOR(S) : Derks et al.

It is certified that error appears in the above-identified patent and that said Letters Patent is hereby corrected as shown below:

In the Specification

Column 19
Line 16, Delete "1-$T_{oblique}$ A." and insert -- 1-$T_{oblique}$-A. --, therefor.

In the Claims

Column 20
Line 13 (Approx.), In Claim 1, delete "reffered" and insert -- referred --, therefor.
Line 26, In Claim 1, delete "average" and insert -- averages --, therefor.

Column 21
Line 40, In Claim 17, delete "wavelength." and insert -- wavelength range. --, therefor.

Column 22
Line 55, In Claim 32, delete "corresponding," and insert -- corresponding --, therefor.

Signed and Sealed this
Nineteenth Day of April, 2016

Michelle K. Lee
*Director of the United States Patent and Trademark Office*